United States Patent [19]

Froberg et al.

[11] Patent Number: 4,815,572
[45] Date of Patent: Mar. 28, 1989

[54] BRAKE SYSTEM WITH IMPROVED BRAKE MATERIAL

[75] Inventors: Robert W. Froberg, Easton, Pa.; Thomas E. Pratt; Bruce A. Grider, both of Avon Lake, Ohio; Otto C. Miller, Berea, Ohio

[73] Assignee: Parker-Hannifin Corporation, Cleveland, Ohio

[21] Appl. No.: 77,348

[22] Filed: Jul. 24, 1987

[51] Int. Cl.⁴ .............................................. F16D 69/02
[52] U.S. Cl. ................................ 188/251 M; 188/73.2
[58] Field of Search ................. 188/73.1, 73.2, 251 A, 188/251 M; 192/107 M

[56] References Cited

U.S. PATENT DOCUMENTS

| | | | |
|---|---|---|---|
| 3,497,044 | 2/1970 | Kalns | 188/251 M X |
| 3,932,568 | 1/1976 | Watts et al. | 188/251 A X |
| 3,936,552 | 2/1976 | Krupp et al. | |
| 3,948,569 | 4/1976 | Gentet et al. | |
| 3,956,548 | 5/1976 | Kovac et al. | 188/251 A X |
| 3,966,029 | 6/1976 | Spain | |
| 3,970,174 | 7/1976 | Kirkhart | |
| 3,972,395 | 8/1976 | Jannasch et al. | |
| 3,983,974 | 10/1976 | Dowell et al. | |
| 4,002,225 | 1/1977 | Marin | |
| 4,007,814 | 2/1977 | Berger | |
| 4,011,055 | 3/1977 | Hill et al. | 188/251 A X |
| 4,029,829 | 5/1977 | Weaver et al. | |
| 4,051,097 | 9/1977 | Aldrich | |
| 4,051,930 | 10/1977 | Masclet | 188/251 A |
| 4,083,434 | 4/1978 | Pinter | |
| 4,088,590 | 5/1978 | Knoblauch et al. | |
| 4,103,099 | 7/1978 | Allsopp | |
| 4,115,284 | 9/1978 | Kinoshita et al. | |
| 4,117,912 | 10/1978 | Ruppe, Jr. | |
| 4,175,070 | 11/1979 | Klein et al. | |
| 4,187,932 | 2/1980 | Zarembka | 188/251 M X |
| 4,214,651 | 7/1980 | Cunningham | |
| 4,249,642 | 2/1981 | Anderson et al. | |
| 4,268,657 | 5/1981 | Manzara | |
| 4,280,935 | 7/1981 | Ogiwara | |
| 4,286,694 | 9/1981 | Wiseman, Jr. et al. | |
| 4,297,307 | 10/1981 | Taylor | |
| 4,341,830 | 7/1982 | Betts et al. | |
| 4,348,490 | 9/1982 | Ogiwara | |
| 4,384,053 | 5/1983 | Peilloud et al. | |
| 4,715,486 | 12/1987 | Burgdorf et al. | 188/251 M X |

FOREIGN PATENT DOCUMENTS

| | | | |
|---|---|---|---|
| 0163835 | 9/1983 | Japan | 188/251 A |
| 1052636 | 12/1966 | United Kingdom | 188/251 M |

*Primary Examiner*—Duane A. Reger
*Attorney, Agent, or Firm*—Christopher H. Morgan

[57] ABSTRACT

A brake element and system where the brake friction surface of the element is a refractory metal carbide. The brake element has a molded carbon structure for mechanical and structural strength and the friction surface or surfaces thereon are converted to refractory metal carbide. The refractory metal carbide is preferably silicon carbide and the depth of conversion is preferably from 0.015 inches to 0.15 inches.

9 Claims, 4 Drawing Sheets

BRAKE SYSTEM WITH IMPROVED BRAKE MATERIAL

FIELD OF THE INVENTION

The present invention relates in general to brakes and brake systems for vehicles and the like, and more particularly, to brake materials and friction surfaces for such brake systems.

BACKGROUND OF THE INVENTION

A wide variety of brake materials are presently available for meeting the needs of today's vehicle brakes. One of the most demanding brake applications requiring use of materials with the best available properties is in the field of aircraft brakes. Aircraft brakes must be lightweight, while having high static and dynamic friction characteristics. They must produce consistent and smooth braking while demanding only relatively low pressure to produce the desired braking. The life of the brake material must be long enough to prevent constant changing of the brakes. Among the materials presently used for such brakes are organic substances, copper, steel and carbon.

One type of carbon aircraft brake is made from carbon/carbon composites. Carbon brakes are formed by a heated mold process into disks having very light weight and a relatively low coefficient of friction. The faces of the disks serve as the friction surfaces. Because carbon disks have a low coefficient of friction, the demands of aircraft brakes require that such disks be arranged in multiple disk brake systems so that sufficiently high braking ability is achieved. These brakes also suffer from inconsistent friction characteristics. Particularly, the dynamic coefficient of friction of carbon brakes is erratic at low speeds and the static coefficient of friction is erratic over broad temperature ranges.

SUMMARY OF THE INVENTION

It is accordingly an object of the present invention to provide an improved brake system utilizing a brake material with improved braking characteristics.

It is also an object of the present invention to provide an improved braking system with brake materials which are long lasting, have consistent friction characteristics, and are light in weight.

In accordance with these objects, the present invention comprises a brake system with first and second brake elements, each having a refractory metal carbide surface thereon. A brake mechanism holds and operatively presses the brake elements together such that the refractory metal carbide friction surfaces can bear on each other in a braking action. The refractory metal carbide friction surfaces together provide surprisingly improved braking and wear characteristics.

Preferred are braking elements having carbon cores, the friction surfaces of which have been converted to a refractory metal carbide. Also preferred are such elements where the refractory metal carbide comprises silicon carbide and where the silicon carbide has a penetration thickness of from about 0.015 inches to about 0.150 inches from the surface of the disk. A thickness of about 0.060 inches is most preferred for this type of material.

The brake elements of the present invention are ideally formed in the shape of disks with one or both faces of the disks converted to silicon carbide and serving as friction surfaces. Conventional configurations of carbon brake disks are suitable for the present invention and may be converted to a brake system of the present invention by forming the friction surfaces of silicon carbide.

For a further understanding of the invention and further objects, features and advantages thereof, reference may now be had to the following description taken in conjunction with the accompanying drawings.

DESCRIPTION OF PREFERRED EMBODIMENT

The braking system of the present invention provides a much improved braking action by means of a refractory metal carbide braking surface. It has long been known that refractory metal carbides such as silicon carbide are very hard and heat resistant. However, it is also very well known that such refractory metal carbides have very high coefficients of friction. For example, some types of sandpaper and skid resistant floor mats have silicon carbide surfaces because of the high coefficient of friction and cutting ability of the silicon carbide. These properties of cutting and skid resistance would cause one not to use refractory metal carbides in a brake mechanism.

Although it is often desirable to have high coefficients of friction in a brake mechanism, it is also required that the brake mechanism not grab or bind because of inconsistent friction characteristics. Prior to this invention it has generally been thought that refractory metal carbides could not function as brake surfaces since it has been assumed that the material would have extremely inconsistent friction characteristics as the hard, sharp edges of the carbide materials interlocked.

Refractory metal carbides have also not been used as brake surfaces since it has been assumed that the cutting action of such materials would quickly wear the brake into an unusable condition. The cutting ability of materials such as silicon carbide which make them useful for sandpaper and floor mats was thought to be totally inconsistent with the long wear required for brake mechanisms.

Another conceptual problem with utilizing refractory metal carbides for brakes surfaces is that, prior to the present invention, how to form the refractory metal carbide into a useable brake surface was not readily apparent. Sandpaper and floor mats are granular silicon carbide which has been glued to a mat surface. Such a process would not be suitable to create a brake surface since the glue would break down at the high temperatures and stresses resulting from a vehicle brake mechanism operation. Solid silicon carbide materials, on the other hand, do not have sufficiently structural strength to serve as a brake material.

Despite all of these conceptual difficulties presented by conventional wisdom in the brake art, the present brake mechanism invention utilizes a refractory metal carbide friction surface. In fact, a refractory metal carbide brake surface provides relatively consistent friction characteristics, relatively long wear, and is relatively easy to manufacture. The refractory metal carbide brake surface of the present invention provides much improved braking characteristics in certain brake applications.

Figure 1:
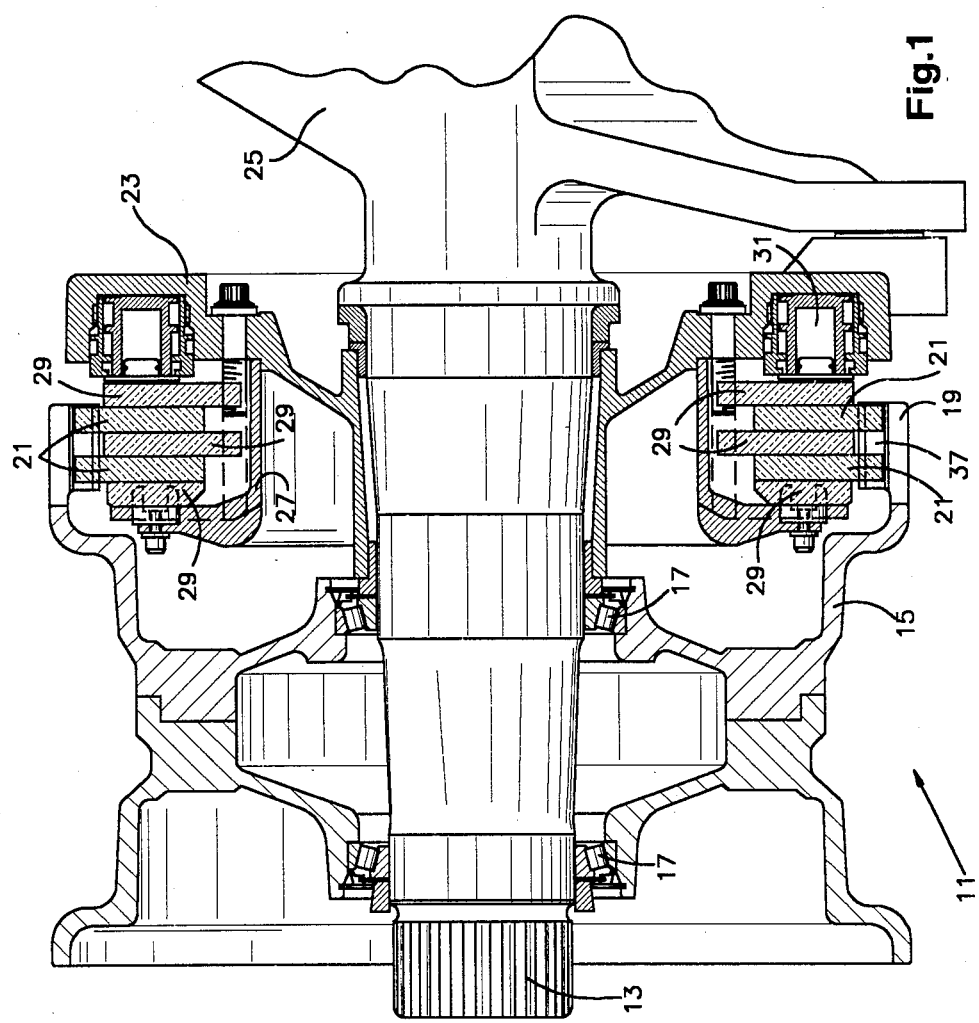
FIG. 1 is a cross sectional view of a brake system constructed in accordance with the present invention.

Referring now to FIG. 1, a brake mechanism 11 constructed in accordance with the present invention is shown in cross sectional view. The sectional view is taken along a line through the center of a wheel shaft 13. The mechanism 11 is of a type which will be suitable for use in an aircraft or the like. However, it is believed that the present invention would be suitable as a brake mechanism with all types of vehicles if adapted using the knowledge well known in the braking art.

Mounted for rotation on the shaft 13 is a wheel 15. Journal bearings 17 support the wheel 15 for rotation on the shaft 13. A flange 19 extends axially inwardly from the wheel 15 for retaining radially outer rotating brake disk elements 21. Thus, the rotating brake disk elements 21 rotate with the wheel 15. A brake housing assembly 23 is fixed to the shaft 13 and does not rotate with the wheel 15. Instead, the brake housing assembly 23 and the shaft 13 are fixed with respect to the vehicle or vehicle strut 25 on which they are used.

Extending axially outwardly toward the wheel 15 from the brake housing assembly 23 is a back plate 27. The back plate 27 has fixed to it radially inner stationary brake disk elements 29. The three stationary brake disk elements 29 are spaced to receive the two radially outer brake disk elements 21 therebetween.

As the wheel 15 rotates the outer brake disk elements 21 rotate therewith. The stationary brake disk elements 29 are held stationary in the housing 23. A hydraulic cylinder 31 is mounted in the housing assembly 23 and is actuated from the cabin of the aircraft by hydraulic pressure. As pressure is applied to the brake cylinder 31, pistons within the brake cylinder move axially to press the stationary and rotating disks 21 and 29 together. This produces a braking action by preventing the wheel 15 from rotating or braking the rotation of the wheel 15. This generates the braking action which decelerates or holds the vehicle.

The construction of the brake mechanism described above is essentially conventional. The improvement of the brake mechanism of the present invention is in the construction of the brake disk elements 21 and 29. A portion of an element 21 is shown in more detail in FIGS. 2 and 3. It has long been known that one possible material for brake disk elements is carbon/carbon composite. Examples of materials which are utilized to make the carbon brake disk elements of the prior art are rayon, PAN and pitch base carbon fiber. An example of pitch base carbon fiber is named P55 and sold by Amoco, and an example of prepreged carbon fiber is named karbon #663 and made by Fiberite. The present invention can utilize a carbon material such as these to form a core onto which the refractory metal carbide surface of the present invention is formed.

Carbon fiber such as mentioned above can be molded into a desired disk shape utilizing a pressurized mold. Such processes for molding a carbon brake are well known and can be utilized to form the core of the present invention. For example, the fiber could be loaded into the mold and then subjected to a 325° F. temperature and a pressure of 1000 psi for approximately two hours to form a conventional type of disk. The disk is then removed from the mold and carbonized at elevated temperature under nitrogen. The carbon is then machined to a desired oversized shape. The carbon core can then be densified utilizing a controlled mixture of methane to form pyrolytic carbon in the interstices of the carbon material. This is a conventional process known as chemical vapor deposition. For example, methane can be introduced over the machined carbonized disk at an elevated temperature of 1100° C. and a reduced pressure of 15 mm of mercury.

Following densification, the core is machined to a final core shape and size. At this point, the carbon brake disk is of a conventional nature.

The present invention converts the friction faces of the carbon core resulting from the above process to a stable, refractory metal carbide of a predetermined depth and of a predetermined nature. As used herein, refractory metals which can form stable, refractory metal carbides are silicon, boron, tungsten, hafnium, zirconium, titanium, uranium, vanadium, niobium, tantalum, chromium, molybdenum, thorium, and plutonium. However, silicon is most preferred.

To convert the friction faces, a refractory metal powder such as silicon powder is placed in contact with the friction face surface of the carbon disk. It is desirable to have the metal powder be at least 50 mesh and more preferably 200 mesh in order to react properly with the carbon surface. With the refractory metal powder in contact with the friction face surface of the disk, the disk and powder are heated to the range of approximately 1400° C. to approximately 2000° C. under argon gas at one atmosphere. More preferably it is heated to the range of 1700° C. to 1900° C. Most preferred is 1800° C. This treatment causes the powder to melt, wet and diffuse into the surface of the carbon core. The treatment continues for approximately 3 hours so that a proper conversion of the carbon to refractory metal carbide will occur. The timing must be gaged so that refractory metal does not remain in an unconverted state to any significant extent in the carbon disk; that is the metal on and in the carbon disk is converted to carbide metal.

The depth of the conversion is controlled by the porosity of the carbon core surface on which the refractory metal powder is placed. This porosity can be adjusted by the densification process and by grinding away the surface to expose the pores after densification. Depth of conversion or penetration depth is important since the conversion to refractory metal carbide changes the mechanical properties and too great a depth will produce a brake disk which is unusable because the mechanical and structural properties of the thick metal carbide will cause it to crack or fracture under normal braking stresses. However, too little depth of carbide will not produce a surface capable of sufficient wear.

Although the present invention is best characterized by complete conversion of the friction face of the disk to refractory metal carbide, it is also possible to utilize the above process to achieve a surface which is harder than carbon but not as hard as the refractory metal carbide. Thus, by restricting the depth of the metal penetration and the density of the metal penetration, an alloy can be created. This alloy characteristic can be adjusted by the porosity of the carbon disk prior to conversion. In turn, the porosity can be controlled by the carbon vapor deposition process and the machining process. In this manner a friction surface with intermediate friction properties and sturdier structural properties can be formed.

Figure 2:
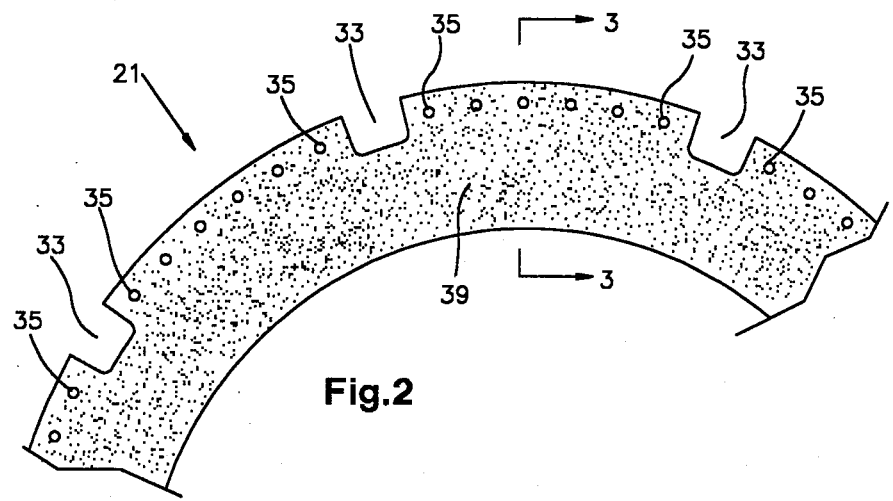
FIG. 2 is a side view of a braking element shown in FIG. 1.

Referring now to FIG. 2, a rotating brake disk element 21 is illustrated. Notches 33 are formed in the outer hub of the disk 21 and are reinforced with metal clips (not shown), attached to the disk 21 through holes 35. Teeth 37 extending inwardly from the flange 19 of wheel 15 extend into the notches 33 to retain the disks 29 against rotation while allowing the disks to move axially in a braking operation.

Figure 3:
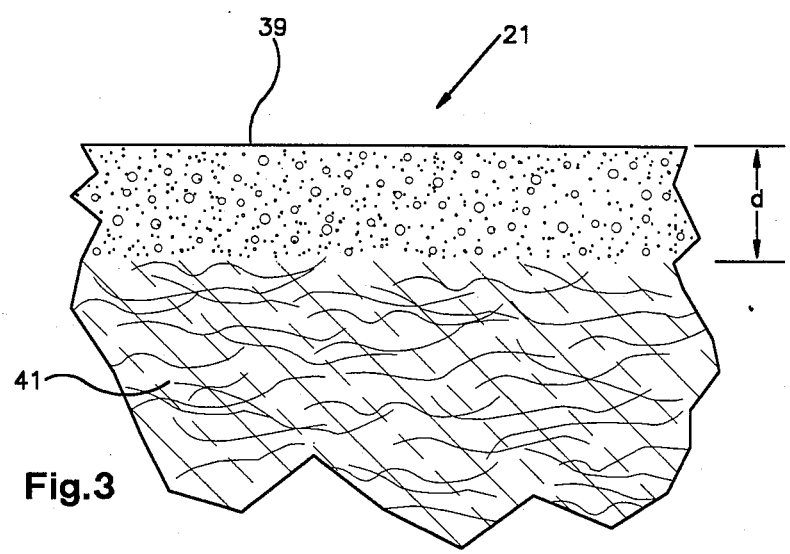
FIG. 3 is a cross sectional view of a portion of the braking element of FIG. 2.

FIG. 3 shows a portion of a cross-section of the brake element 21 taken along the lines shown in FIG. 2. The friction surface 39 of the disk 21 has been converted to silicon carbide while the center or core 41 and the edges (all non-friction surfaces) of the disk 21 are not converted and remain hardened, molded carbon fiber. The penetration depth d of the refractory metal carbide is preferably in the range of about 0.015 inch to about 0.15 inch. Most preferably, the depth is about 0.060 inches. These depths produce a long wearing disk surface of refractory metal carbide while retaining the mechanical properties of the carbon fiber for the disk as a whole. The total axial thickness of the disk 21 is, for example, 0.5 inch and the diameter is, for example, 11 inches. These dimensions are not critical as long as the mechanical properties are not compromised by making them too small.

EXAMPLES

Figure 4:
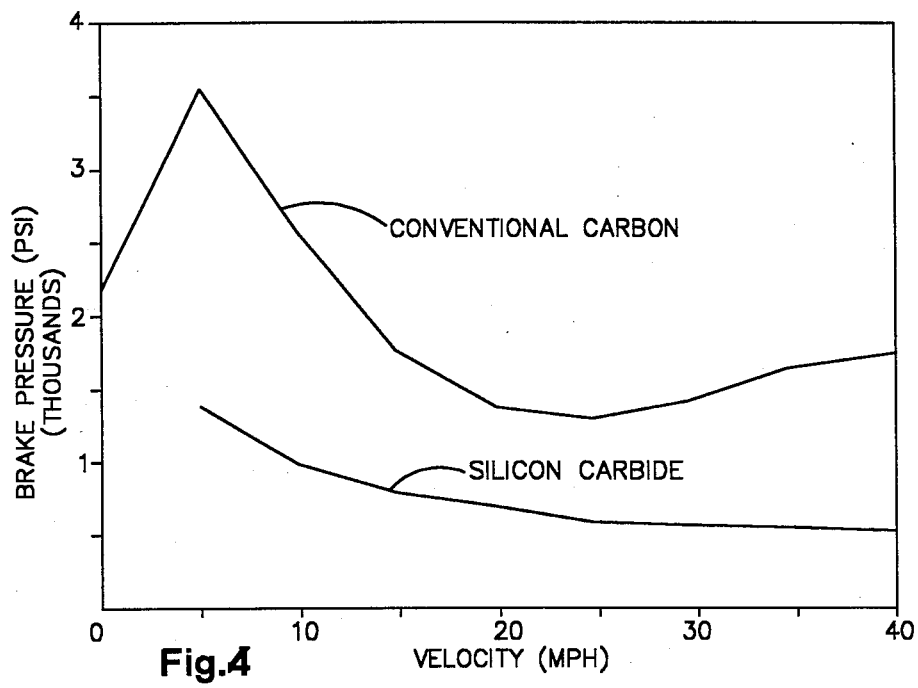
FIG. 4 is a chart illustrating test results of a conventional carbon brake element and a silicon carbide brake element constructed in accordance with the present invention.
Figure 5:
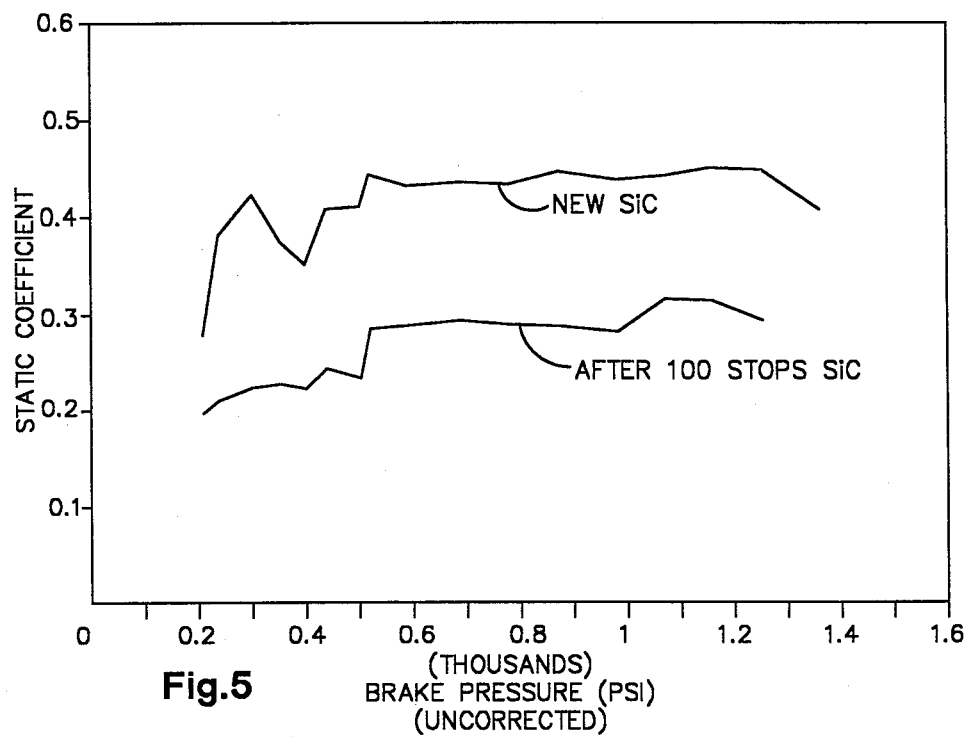
FIG. 5 is a chart illustrating test results of a silicon carbide brake element constructed in accordance with the present invention.
Figure 6:
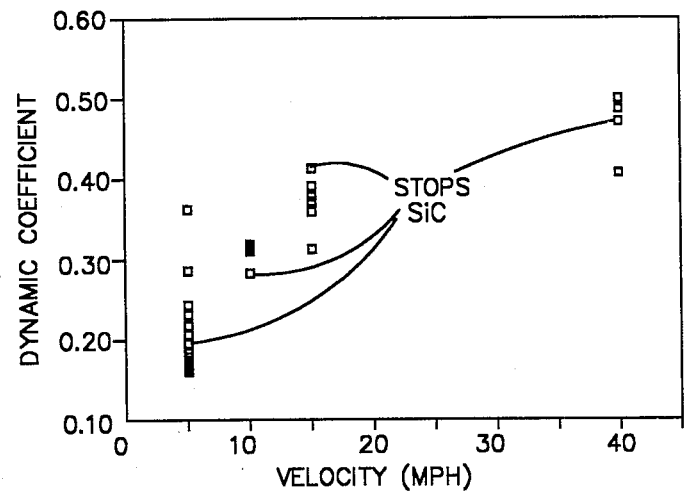
FIG. 6 is a chart illustrating test results of a silicon carbide brake element constructed in accordance with the present invention.

FIGS. 4-6 illustrate properties of a brake disk and brake system constructed according to the description above with silicon carbide friction surfaces. FIG. 4 illustrates the tested properties of such a silicon carbide-silicon carbide brake test using the present invention compared to a brake test using a conventional carbon-conventional carbon brake of the same dimensions. This test illustrates that the present invention achieves a relatively constant dynamic coefficient of friction at both high and low speeds.

In each test the wheel was rotated at selected speeds with an inertia of 10,570 pounds. The brake pressure to stop the wheel with a deceleration of six feet per second was measured for each speed. The results illustrated in FIG. 4 show that conventional carbon requires a consistently higher brake pressure from 5 to 40 miles per hour and the range of pressure required is greater.

The test illustrated in FIG. 5 is of a similar silicon carbide brake of the present invention as the FIG. 4 silicon carbide brake but tests for static coefficient of friction. A range of brake pressure was applied to both a new brake and a brake which had been stopped 100 times. The static coefficient of pressure was measured for each and is illustrated in FIG. 5. This shows that the static coefficient of friction of the present invention brake is relatively constant in both old and new brakes and that many stops do not change the static coefficient of friction greatly.

The test illustrated in FIG. 6 is of a brake of the present invention as described with the FIGS. 4 and 5 tests. In this test dynamic coefficient of friction is measured for repeated stops at 5, 10, 15 and 40 miles per hour with an inertia of 10,570 pounds and a 6 ft./sec. deceleration. The measured coefficient for each stop is plotted to show the range at each speed.

As can be seen, the brake mechanism of the present invention is well adapted to achieve the objects and advantages mentioned as well as those inherent therein. While the above description and examples are intended to illustrate the invention, many changes in the construction and arrangement of parts can be made by those who are skilled in the art.

The foregoing disclosure and the showings made in the drawings are merely illustrative of the principles of this invention and are not to be interpreted in a limiting sense.

What is claimed is:

1. A brake system comprising:
   a first brake element with a refractory metal carbide friction surface thereon;
   a second brake element with a refractory metal carbide friction surface thereon; and
   brake mechanism means for holding and operatively pressing said first and second brake elements together such that said refractory metal carbide friction surfaces of each of said element can bear on each other in a braking action.

2. The brake system of claim 1 wherein said first and second brake elements comprise carbon cores, the friction surface of which has been converted to a refractory metal carbide.

3. The brake system of claim 2 wherein said refractory metal carbide friction surface comprises silicon carbide.

4. The brake system of claim 3 wherein the thickness of the silicon carbide friction surface is from about 0.015 inches to about 0.15 inches.

5. A carbon brake element for use in a brake system and having a friction surface thereon, comprising:
   a carbon structure for providing the mechanical and structural properties of the brake element; and
   a brake friction surface disposed on said carbon structure and comprised of refractory metal carbide material formed by converting carbon of said carbon structure to refractory metal carbide.

6. The carbon brake element of claim 5 wherein the refractory metal carbide surface has a depth of from about 0.015 inches to about 0.15 inches.

7. The carbon brake element of claim 5 wherein said refractory metal carbide comprises silicon carbide.

8. The carbon brake element of claim 7 wherein the silicon, carbide surface has a depth of from about 0.015 inches to about 0.15 inches.

9. The carbon brake element of claim 7 wherein the silicon carbide surface has a depth of about 0.06 inches.

* * * * *